| (12) United States Patent | (10) Patent No.: US 6,202,830 B1 |
| Bohlin et al. | (45) Date of Patent: Mar. 20, 2001 |

(54) CONVEYOR ARRANGEMENT AND CONVEYOR LINE

(75) Inventors: Christer Bohlin, Deje; Hans O. Larsson, Kil, both of (SE)

(73) Assignee: Outokumpu Wenmec AB, Kil (SE)

( * ) Notice: Subject to any disclaimer, the term of this patent is extended or adjusted under 35 U.S.C. 154(b) by 0 days.

(21) Appl. No.: 09/091,811

(22) PCT Filed: Jan. 2, 1997

(86) PCT No.: PCT/SE97/00002

§ 371 Date: Aug. 24, 1998

§ 102(e) Date: Aug. 24, 1998

(87) PCT Pub. No.: WO97/24475

PCT Pub. Date: Jul. 10, 1997

(30) Foreign Application Priority Data

Jan. 2, 1996 (SE) .................................................... 9600007

(51) Int. Cl.[7] .................................................... B65G 37/00
(52) U.S. Cl. .................................... 198/465.4; 198/468.6; 198/774.2
(58) Field of Search ............................... 198/465.4, 468.6, 198/682.1, 681, 774.2, 773; 204/198; 414/749.4

(56) References Cited

U.S. PATENT DOCUMENTS

| 1,866,124 | * | 7/1932 | Oertli | .................................. | 204/198 |
| 4,220,240 | * | 9/1980 | Norberg et al. | .................... | 198/465.4 |
| 4,626,159 | * | 12/1986 | Scannell | .............................. | 198/468.6 |
| 4,669,607 | * | 6/1987 | Mason | ................................ | 198/468.6 |
| 5,012,918 | * | 5/1991 | Acker et al. | ........................ | 198/468.6 |

\* cited by examiner

Primary Examiner—Joseph E. Valenza
(74) Attorney, Agent, or Firm—Smith-Hill and Bedell

(57) ABSTRACT

An arrangement for conveying plates (4) in particular mother plates with or without a deposited metal layer, in an electrolytic metal refining plant, wherein the plates are intended to be conveyed in the conveyor arrangement (25, 50) along at least one horizontal conveyor path with the plates orientated generally vertical and equidistant from one another therealong, characterized in that the conveyor arrangement is of the walking beam kind and includes fixed supports (28, 54) and at least one walking beam (30, 62) having movable supports (31, 67), wherein the walking beam is arranged to move in a cyclic pattern, including a lifting movement in which all the plates conveyed along the path are lifted by the movable supports from their fixed supports in a first position, a forward movement in which all plates are advanced simultaneously one step while resting on their movable supports, a lowering movement in which the plates are placed on fixed supports in a new, second position, and a return movement, wherein the length of one step corresponds to the plate spacing (PI; PII) along the path.

17 Claims, 9 Drawing Sheets

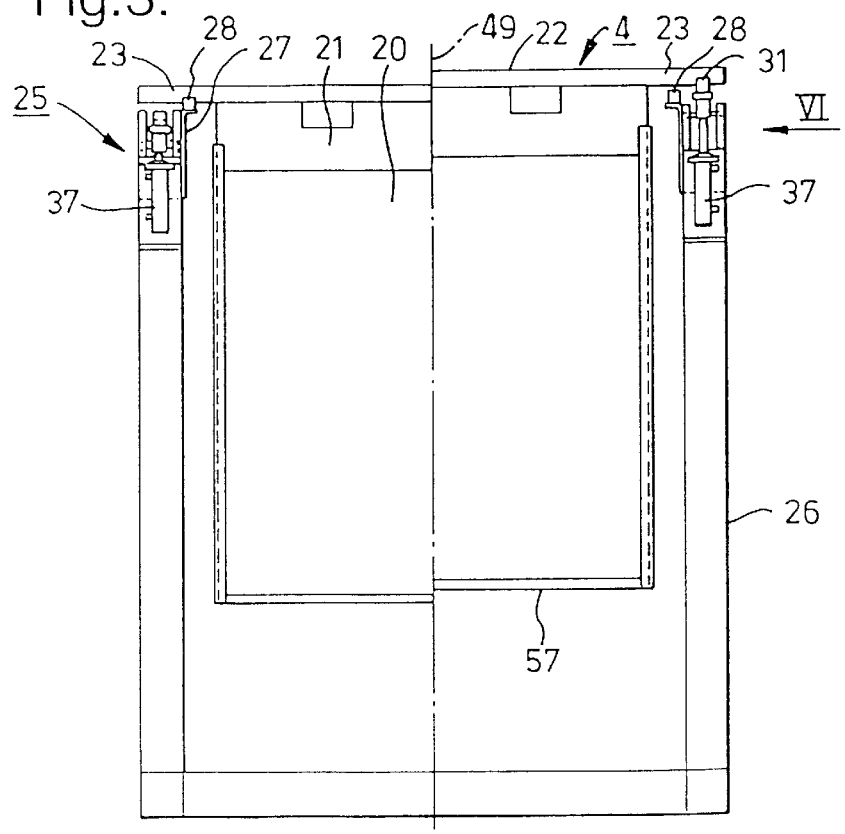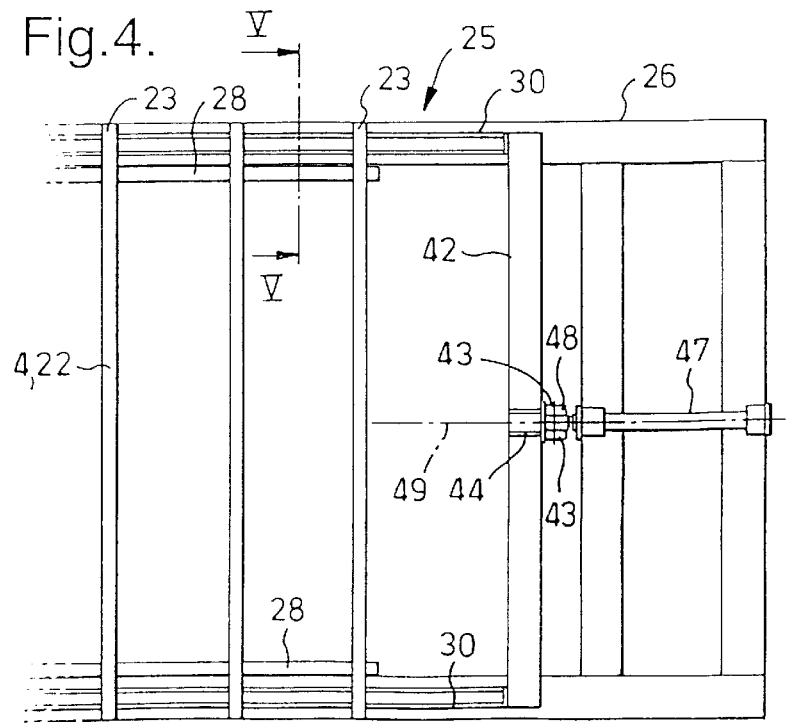

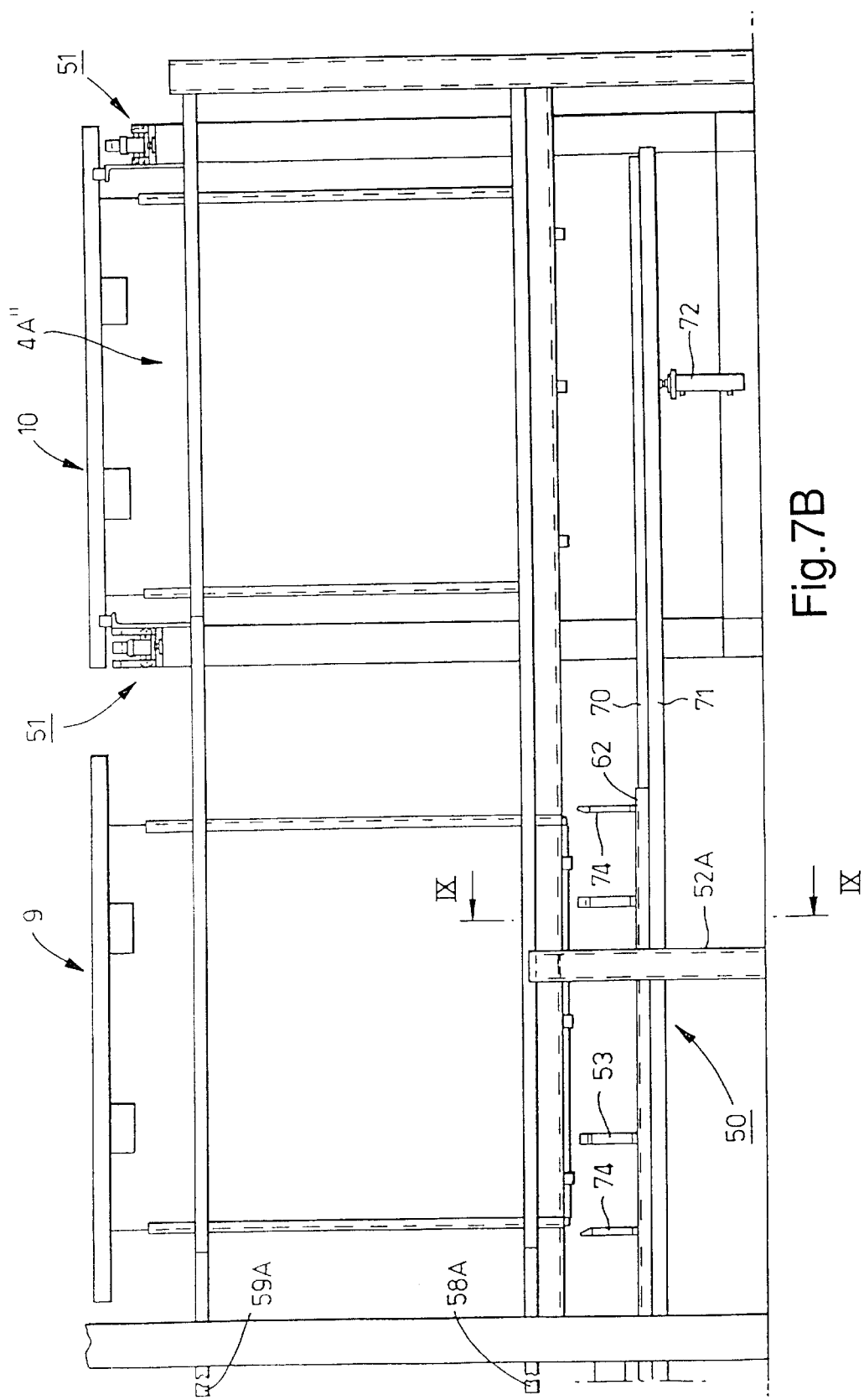

CONVEYOR ARRANGEMENT AND CONVEYOR LINE

FIELD OF INVENTION

The present invention relates to an arrangement for conveying plates, particularly mother plates, with or without deposited metal layers, in a plant for electrolytically refining metals, in which arrangement the plates are intended to be conveyed along at least one horizontal conveyor path while positioned generally vertically and equidistantly in the conveyor path. The invention also relates to a conveyor line which includes two horizontal and mutually perpendicular conveyor paths, wherein an inventive conveyor arrangement is disposed along each conveyor path.

DESCRIPTION OF THE BACKGROUND ART

In the electrolytic refinement of copper and certain other metals, metal layers are deposited on both sides of so-called mother plates which hang vertically from a horizontal rod, hereinafter called the yoke, having laterally and outwardly projecting parts which form electric contact means for the passage of electric current during the electrolysis process. The plates hang in mutually parallel and equidistant relationship in the tank. Subsequent to the refined metal having been precipitated to a desired thickness onto both sides of the mother plates, the mother plates with their metal layers deposited are moved batch-wise to a plant for further treatment. A primary operation in this plant is to strip the deposited layers from the mother plates. The plates are first advanced along a first horizontal path in the stripping and conditioning plant in their transverse direction. The plates are then transferred to a second path, in which they are conveyed in their longitudinal direction. The actual stripping operation is carried out in this second path. The mother plates are then transferred to a third path which extends parallel with the first path and along which the plates are again advanced in their transverse direction.

In the technique used at the present time, this technique having been practised for a very long time, the plates are normally moved along all three horizontal conveyor paths on chain conveyors or other types of endless conveyors. Conventional endless conveyors are also used in other mother plate treatment plants, e.g. plate washing or plate alignment plants, etc. SE 81013427, SE 329011, U.S. Pat. No. 4,577,401 and U.S. Pat. No. 4,069,925 disclose examples of this type of arrangement for conveying mother plates with or without deposited metal layers in conjunction with the pre-treatment or after-treatment of the mother plates in conjunction with the electrolytic refinement of metals.

A significant drawback with endless conveyors used in this technical field, normally chain conveyors, is that they are very expensive. This is mainly due to the harsh working environment of the conveyors. For instance, it is necessary to manufacture the chains and also support wheels and other devices from acid-proof steel, at least along parts of the conveyor line. The expensiveness of chain conveyors in this type of plant is also contingent on the necessity to manufacture bearings, bushes and the like from a special material. Another drawback with such conveyors is that they require the provision of separate devices for switching the plates from one conveyor path to another. In the absence of better conveyor arrangements, chain conveyors or other continuously working conveyors are still used in plants of the aforesaid kind in spite of these drawbacks.

It is also known to convey mother plates in their transverse direction with the aid walking beam conveyors. In this known technique, the plates hang from longitudinally extending rails on lugs which form electric contact devices on the plates in the electrolysis process. The plates are advanced with the aid of the walking beam conveyors with the platecarried contact lugs resting on said rails. One significant drawback with this method is that the lugs are subjected to a high degree of wear due to sliding on the carrier rails. Another drawback is that the rails do not indicate distinct plate positions as the plates are stepped forwards to new positions.

SUMMARY OF THE INVENTION

The object of the invention is to provide an improved conveyor arrangement. More particularly, it is an object of the invention to provide a conveyor arrangement which does not require the use of endless conveyors, such as chain conveyors. A further object is to provide a conveyor arrangement which operates in a manner in which those surfaces which are to conduct current to the plates in the electrolysis process will be subjected to the minimum of wear. Another object of the invention is to provide conveyor arrangements which do not utilize endless conveyors for conveyor the plates in their transverse and longitudinal directions. In those cases in which the plant includes a conveyor line having two or more mutually perpendicular conveyor paths, as is often the case in plants of this kind, and in which the plates are switched from one conveyor path to the other, a further object of the invention is to provide conveyor arrangements which do not require separate devices for switching the plates from one conveyor path to the next conveyor path in said conveyor line.

These and other objects can be achieved with a conveyor arrangement in the form of a walking beam conveyor which includes fixed supportive devices and at least one walking beam having movable supportive devices, wherein the walking beam is arranged for movement in a cyclic pattern that includes a lifting movement in which all plates conveyed along the path are lifted by the movable supportive devices from their fixed supports in a first position, a forward advancing movement in which all plates are advanced simultaneously through one step or increment while resting on their movable supports, a lowering movement in which the plates are placed on fixed supports in a new position, and a return movement, wherein the length of the step corresponds to the plate spacing along the path.

Further aspects of the invention will be apparent from the following Claims and also from the following detailed description of an exemplifying embodiment of the invention.

BRIEF DESCRIPTION OF THE DRAWINGS

The invention will now be described in detail with reference to the accompanying drawings, in which

FIG. 3 is a view taken on the line III—III in FIG. 2;

FIG. 4 is a view taken along the line IV—IV in FIG. 2 and seen from above;

FIGS. 7A and 7B, collectively referred to as FIG. 7, present a side view taken on the line VII—VII in FIG. 1 and illustrate the first conveyor arrangement, a third conveyor arrangement and the initial and terminating parts of a second conveyor arrangement;

DETAILED DESCRIPTION OF THE INVENTION

Description of the arrangement

Figure 1:
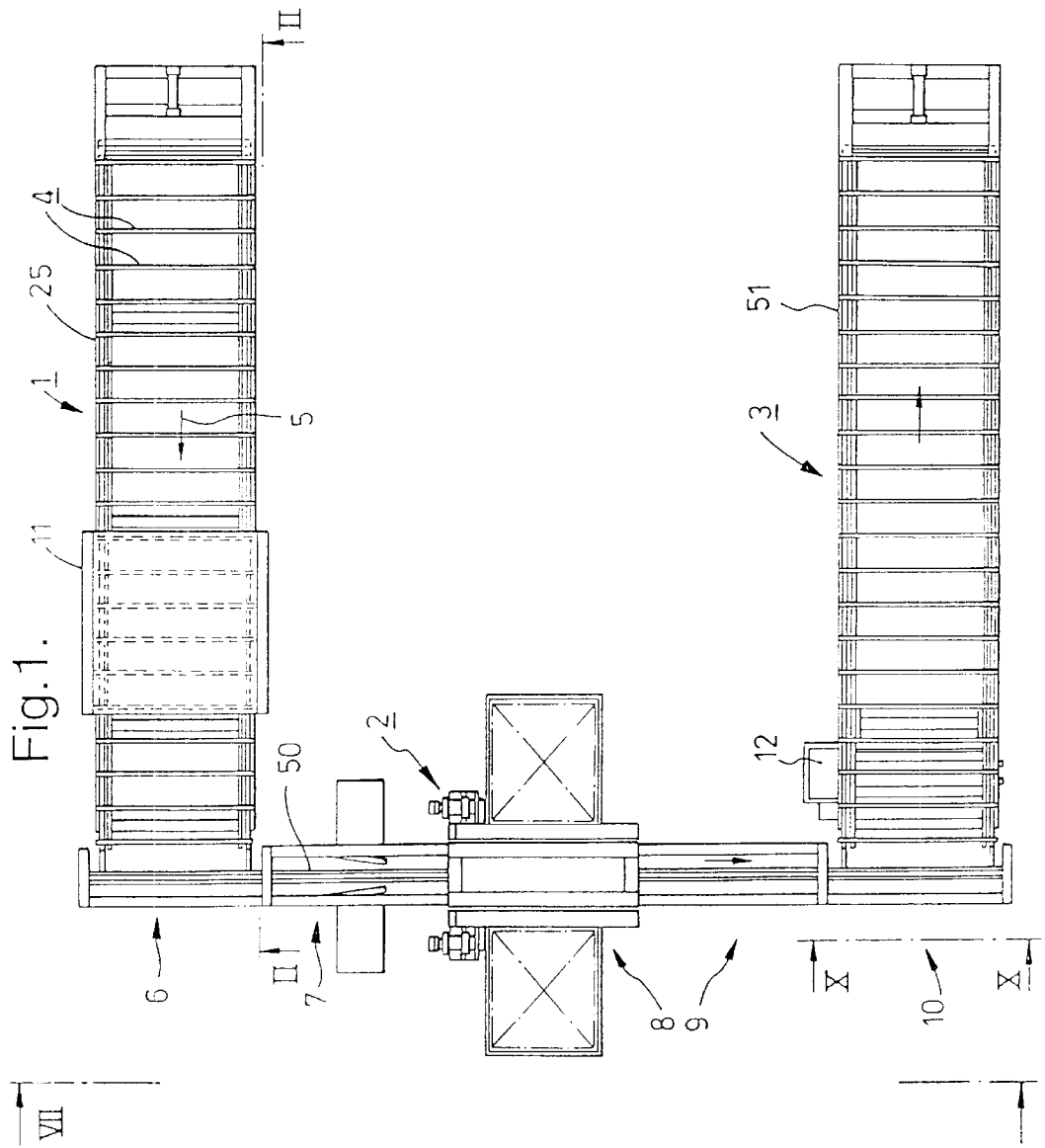
FIG. 1 illustrates a plant for treating mother plates that have been coated electrolytically with metal layers in an electrolysis process.

With reference first to FIG. 1, three conveyor paths are identified generally by reference numerals 1, 2 and 3 respectively. The three conveyor paths 1, 2 and 3 together form an integrated conveyor line. The conveyor path 1 forms an infeed path for plates generally referenced 4, these plates being advanced in the direction of the arrow 5 perpendicular to the plane of the plates. The path 2 advances the plates in their longitudinal direction. This conveyor path includes a receiving station 6, a preparatory stripping station 7, a separating station 8 where the coating layers 20 (FIGS. 2 and 3) are separated from the mother plates 21, an inspection station 9 and an offloading station 10. The plate treatment equipment in stations 7, 8 and 9 forms no part of the present invention and will not therefore be described in detail here. This also applies to a washing unit 11 in the first path 1 and to apparatus 12 for treating the bottom edges of the mother plates in the third path 3.

The plates 4 comprise typical, essentially square mother plates 21 which are coated on both sides thereof with a coating layer 20. The mother plate 21 is fastened to and hangs from a horizontal rod 22, hereinafter referred to as the yoke, the two end-parts 23 of which project out beyond the side edges of the plate 21, these end-parts 23 being referred to as lugs in the following description A first conveyor arrangement for conveying the plates 4 along the first conveyor path 1 is generally referenced 25 in FIGS. 2–4. Fixedly mounted on each long side of a stand 26 is a longitudinally extending rail 27 which carries a longitudinally extending support strip 28 having recesses 29 for accommodating the lugs 23 on the yoke 22. The spacing PI between the recesses 29 is equal to the spacing between the plates 4 in the electrolysis bath and equal to each walking step of the first conveyor arrangement 25, as hereinafter described. The strips 28 are formed of a lug-friendly plastic material and form electric contact surfaces in the electrolysis process. The plastic strips 28, or more specifically the recesses 29, form fixed supports for the plates 21 in the first conveyor arrangement 25. The right-hand part of FIG. 2, the left-hand part of FIG. 3 and FIGS. 5 and 6 show the lugs 23 resting on said fixed supports in the recesses 29.

A pair of longitudinally extending, parallel walking beams arranged parallel with and outwardly of respective fixed supports 28 have been generally referenced 30. Each comprises a plastic strip 31 of the same configuration as the fixed support strip 28, attached to a metal guide rail 32 having a cross-section in the form of an inverse U. The plastic strip 31 includes recesses 33 which define the movable supports of the conveyor arrangement and which have the same configuration and same spacing as the recesses 29 in the fixed support strip 28.

Figure 5:
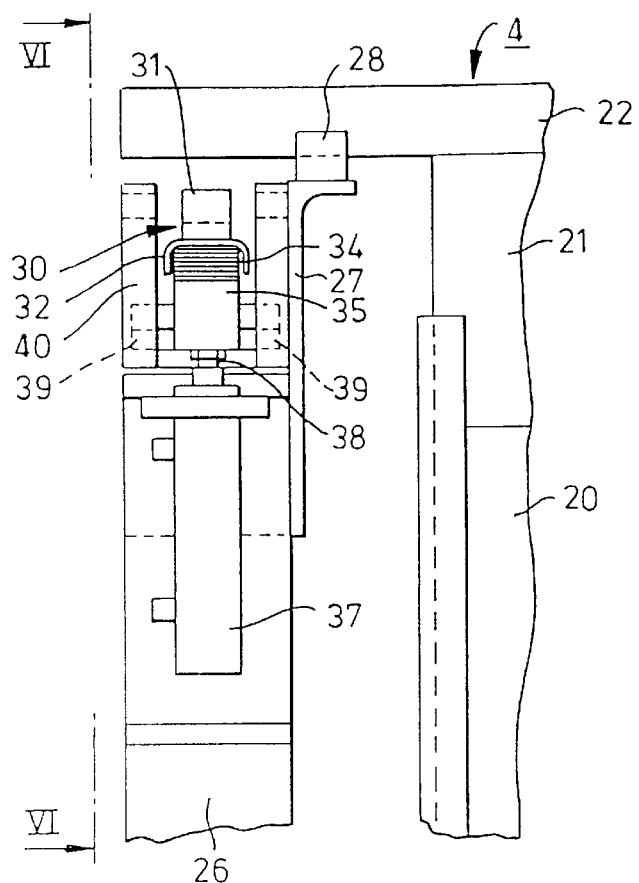
FIG. 5 is a view in still larger scale taken on the line V—V in FIG. 4.
Figure 6:
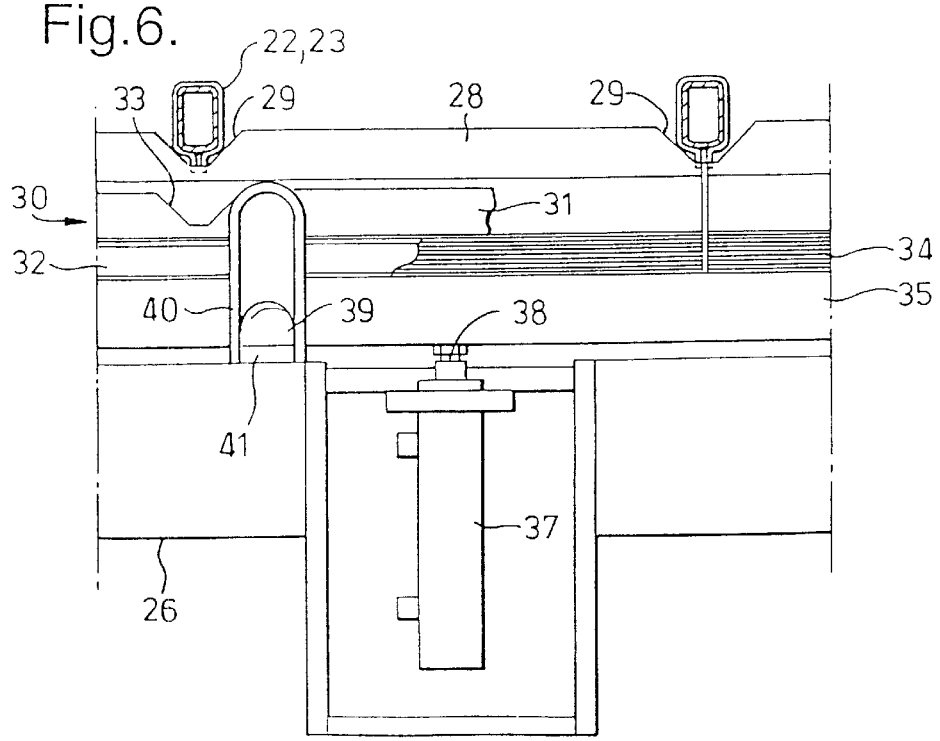
FIG. 6 illustrates certain parts of the arrangement in the direction of the arrow VI in FIG. 3, in the same scale as in FIG. 5.

FIGS. 5 and 6 show a walking beam 30 in its lower position in which the beam rests on a plastic slide rail 34 with the legs of the guide rail 32 embracing the slide rail 34. This is fixedly connected, in turn, to a robust metal lifting beam 35.

The walking beams 30 are moved vertically by means of vertically acting movement devices. These devices include for each walking beam four first hydraulic lifting cylinders 37 mounted on the stand 26. The pistons 38 of the lifting cylinders 37 are connected to respective lifting beams 35. The lifting beam 35 also has a number of horizontal pins 39 which project out pair-wise in respective directions through a fixed generally U-shaped device 40 on a plate 41 on the stand 26. The U-shaped devices 40 have an inner width equal to the width of the pins 39, so that the pins 39 are able to slide in said devices 40 as the beam 30 is raised, while preventing longitudinal movement of the beam 35. The upper part of the generally U-shaped devices has a semi-circular shape that corresponds to the shape of the upper side of the pins 39. The inner height of the U-shaped devices 40 and the vertical extension of the pins 39 determine the length of stroke of the lifting cylinders 37, said length being 60 mm in one embodiment.

The rear ends of the two walking beams 30 are mutually connected by a transverse beam 42. A pair of casings 43 in the form of two upstanding rectangular frames are connected to the transverse beam 42 through the medium of pins 44. The casings 43 accommodate a transverse horizontal pin 45 which is slidably arranged to enable the beams 30, the transverse beam 42 and the casings 43 to be raised and lowered in relation to the pin 45, the diameter of which coincides with the inner width of the casings 43. Furthest to the rear of the stand 26 is a centrally mounted, horizontal hydraulic cylinder 47 having a piston rod 48 which can move horizontally in the symmetry plane 49 of the conveyor path 1. The piston rod 48 is connected to the pin 45 for horizontal movement of the walking beams 30 through the medium of the casing 43 and the transverse beam 42, both in a lower position in which the pin 45 is in its highest position relative to the casings 43, and in an upper position in which the pin 45 is located at the bottom of the uplifted casings 43.

Figure 7A:
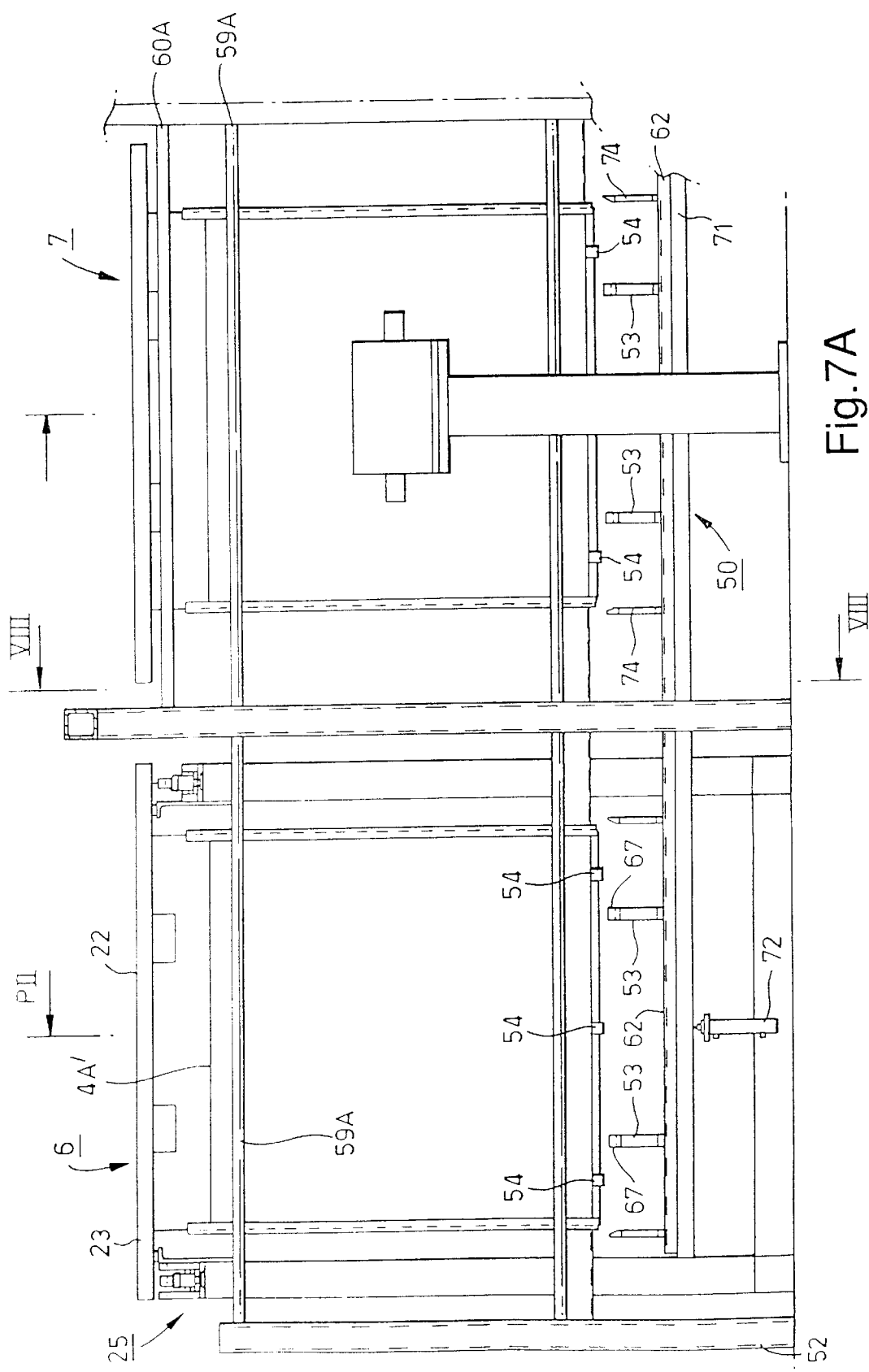
Figure 8:
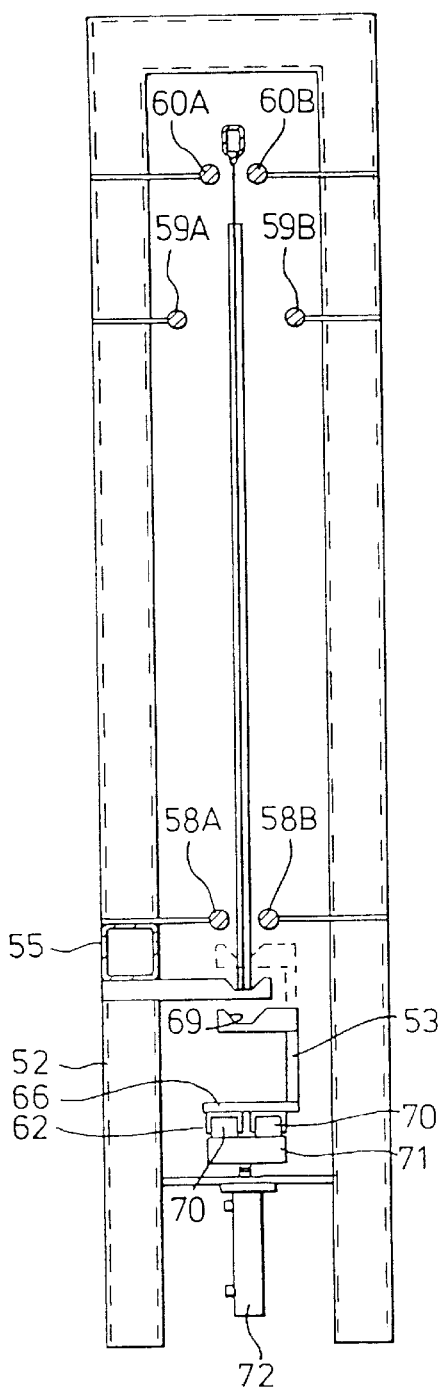
FIG. 8 is a view taken on the line VIII—VIII in FIG. 7.

Generally referenced 50 in FIG. 7 is a conveyor arrangement for moving the plates 4 in their longitudinal direction along the next following conveyor path 2. FIG. 7 also shows end views of the conveyor arrangement 25 in the first conveyor path 1 and a conveyor arrangement 51 in the third conveyor path 3. This third conveyor arrangement 51 has the same construction as the first conveyor arrangement 25 and will not therefore be described in detail.

The second conveyor arrangement 50 is mounted in a stand which is generally referenced 52 and which also functions to support other apparatus arranged along the conveyor path 2 for stripping the plates 4. A plurality of supports 54 are fixedly mounted on the stand 52. These supports have the form of arms which extend horizontally at right angles from the underside of a longitudinally extending beam 55. Provided in the outer end is a recess 56 which defines a support for the bottom edge 57 of the plates 4. Three such fixed supports 54 are provided in each station 6, 7, 8, 9 and 10.

Also provided are lower and upper fixed side supports 58A, 58B and 59A and 59B respectively. Of these supports, outer side supports 58A and 59A extend along all stations with the exception of station 8, whereas the inner side supports 58B and 59B extend only along the stations 7 and 9. As will be seen from FIG. 2, the receiving station 6 and the offloading station 10 are also provided with inner, upper side supports 61. So that these side supports 61 will not present an obstacle to the plates 4 as the plates are moved from the first conveyor arrangement 25 to the second conveyor arrangement 50, the supports have the form of two short, vertical pins which are secured to the stand 52 by angle ties and extend vertically generally in the plane defined by the fixed support strips 28 in the first conveyor arrangement 25, up over the level of the support strips 28 but not as far as the upper level of the movable support strips 31, so that the plates can be moved past the side supports 61 with the lugs 23 lifted above said support 61, when moving the plates from the first conveyor arrangement 25 to the second conveyor arrangement 50 and, after offloading on fixed support devices included in said second conveyor arrangement 50, are able to lean against the side support 61 in the receiving station 16 via the lugs 23. The offloading station 10 is provided with a corresponding arrangement. A pair of longitudinally extending, centred side supports 60A, 60B are provided at a higher level within the region of the station 7.

One of the walking beams included in the second conveyor arrangement 50 has been generally referenced 62. The beam is formed of a composite construction including a pair of metal guide rails 65 of inverse U-section, one on each side of the centre line of the conveyor arrangement. The two guide rails or beams 65 are held together by a plurality of horizontal, transverse metal plates 66 disposed along the length of the beam 62. The guide rails 65 rest on plastic slide rails 70 which are, in turn, connected to a lifting beam 71 which, distinct from the walking beam 62, extends along the full length of the second conveyor path 2. The length of the walking beam 62 corresponds to the length of the conveyor path 2 minus "the length of a station", i.e. the beam is about 20% shorter than the total path length in the illustrated case, in which the stations are five in number. Mounted beneath the lifting beam 71 are three vertical, second hydraulic lifting cylinders 72 in stations 6, 8 and 10. The cylinders 72 are mounted on the stand 52 and each cylinder has a piston rod 73 connected to the underside of the beam 71. The walking beam 62 is also provided with a pair of vertical end supports 74 for each station, so as to centre the plate in respective treatment station 6–10 when necessary and to prevent the plates 4 from moving in their longitudinal directions when resting on the movable support 67 and being stepped forwards by the cyclically repeated feeding movements, which can require relatively powerful acceleration and retardation with each feeding step, depending on the operating speed of the plant as a whole.

Figure 11:
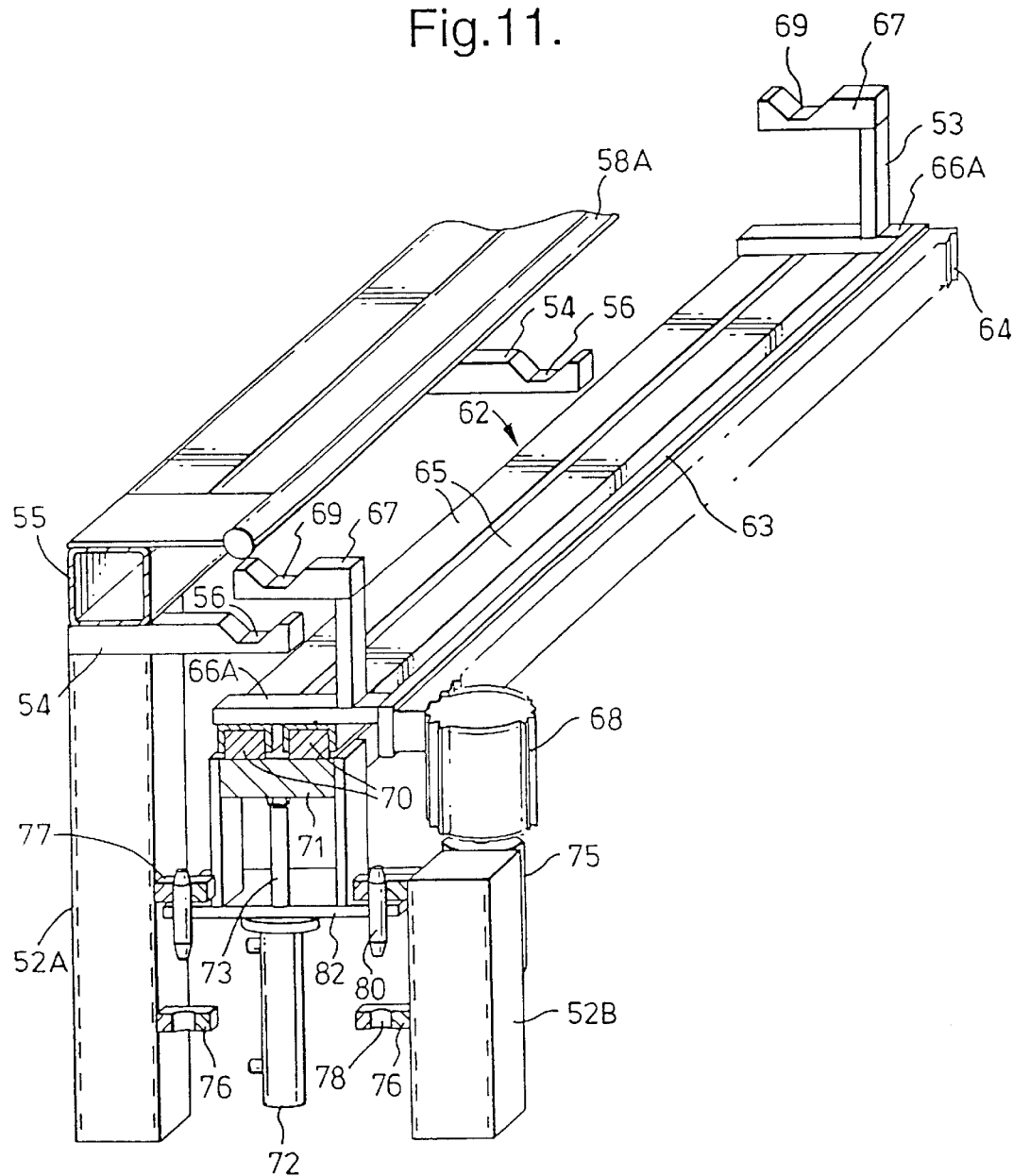
FIG. 11 is a perspective view of part of the second conveyor arrangement with its movement devices shown in still larger scale.

Extending along part of the walking beam 62 within the regions of the stations 9 and 10 and spaced from said beam 62 is a horizontal rack 64 with outwardly facing teeth. The rear side of the rack 64 is joined to a flat metal rail 63 which, in turn, is connected to the walking beam 62 through the medium of a pair of extended transverse plates 66A, FIG. 9A, FIG. 9B and FIG. 11. The rack 64, and therewith also the walking beam 62, can be moved reciprocatingly in a horizontal direction with the aid of a reversible motor 75, preferably an hydraulic motor whose output shaft functions to drive a pinion wheel 68 around a vertical rotational axle. The pinion wheel 68 engages the teeth on the rack 64. The pinion wheel 68 has a width (height) such that said wheel will be in engagement with the rack 64 both in the lower position of the walking beam 62, FIG. 9A, and in the upper position thereof, FIG. 9B. The motor 75 is attached to a foot 52B provided in the stand 52, opposite a stand leg 52A, between the stations 9 and 10.

Mounted on the plates 66 are posts 53 which carry movable supports 67. The posts 53 extend from the respective plates 66 to an extent such as to terminate at a distance from the outer ends of the fixed supports 54, wherein the movable supports 67 extend inwardly from respective posts 53 towards, and slightly beyond the centre line of the conveyor arrangement, at a level beneath or above the fixed supports 54, depending on the positions of the movable supports 67 in the working cycle. Two such supports 67 are provided for each plate 4. These supports include recesses 69 for accommodating the bottom plate edges 57, in correspondence with the fixed supports 54.

Figure 10A:
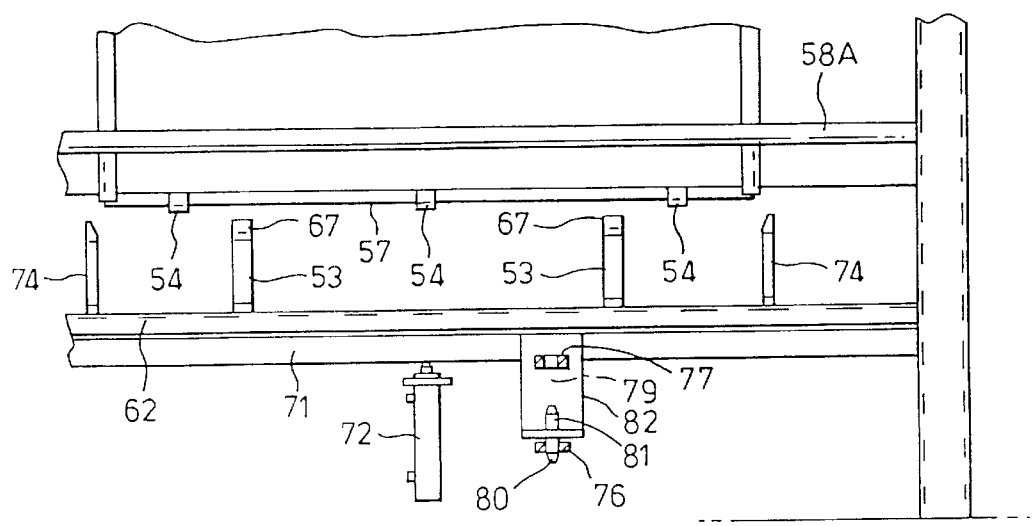
FIGS. 10A and 10B are views taken on the line IX—IX in FIG. 1, showing the conveyor arrangement in two different advance positions.
Figure 10B:
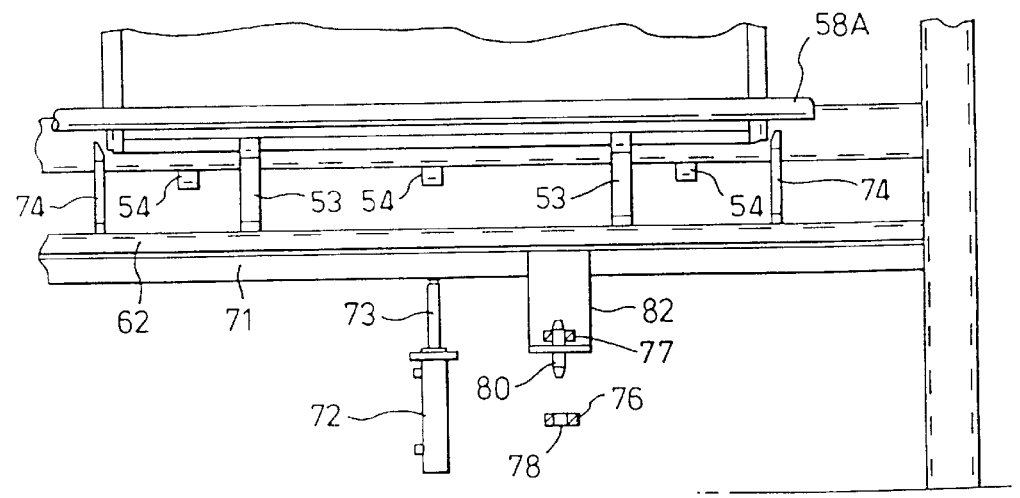

In order to prevent the lifting beam 71 from being subjected to longitudinally acting forces as the walling beam 62 slides on the slide rail 70, locking means are provided analogously with that described above with reference to the first conveyor arrangement. These locking means include lower and upper female members 76, 77, fixed on the stand 52 and provided with holes 78, 79 having vertical centre lines. The locking means also include vertical male members 80, 81 which are mounted on the lifting beam 71 with the aid of bracket means 82 so as to be coaxial with the holes 78, 79. When the lifting beam 71, and therewith the walking beam 62, is located in its lower position, the male members 80 are received in the lower female member 78, and when the lifting beam 71 and the walking beam 62 are located in their respective upper positions, FIG. 10B, the male members 81 are received in the upper female member 79. The distance or spacing between the female members 76 and 77 also determines the length of stroke of the lifting cylinders, which in the illustrated case is 110 mm, i.e. greater than the corresponding length of stroke in the first conveyor arrangement.

In addition to the aforedescribed equipment, the conveyor arrangements also include hydraulic equipment pressure sources, hydraulic lines, etc., and also proportional valves coacting with the horizontally acting hydraulic cylinders to dampen acceleration and retardation forces in a known manner. Also included is a microprocessor which controls the functions of all hydraulic cylinders and also the motor 75 when the motor is an hydraulic motor. Corresponding electrical control means are provided when the motor is an electric motor.

Description of the method of operation

The manner in which the first conveyor arrangement 25 operates in conveying the plates 4 along the first conveyor path 1 will be described first. The conveyor arrangement 25 is loaded with plate batches 4 from the electrolysis tanks with the aid of a crane. The plates 4 are placed in the rear section of the conveyor arrangement 24, this section being assumed to be empty. The spacing between the plates 4 as they are taken from the electrolysis tank is kept constant until the plates have been placed on the fixed supports 28 with the lugs 23 resting in the recesses 29. The walking beams 30 are in their lower, rearward positions at this point.

Conveying of the plates 4 with the aid of the conveyor arrangement 25 is initiated by raising the lifting beams 35 to their upper positions with the aid of the lifting cylinders 37, wherewith the pins 39 slide in the U-shaped members 40 until the upper cylindrical surface of the pins 39 contacts the inner end surface of the U-shaped members 40. The length of stroke of the lifting cylinders 37 and the upper and lower positions of the walking beam 30 are thus determined by the length of the U-shaped members 40 and by the end stops formed by the upper rounded end of said member 40 and the respective plate 41 to which the U-shaped members 40 are attached. During the lifting movement, in which the pins 39 slide in the U-shaped members, the movable supports—the plastic strips 31—engage the lugs 23 outside the fixed supports 28 and lift the plates 4 so as to move the yoke 22 out of contact with the fixed supports 28.

The walking beams 30 are then stepped forwards by the hydraulic cylinder 47, wherewith the guide rail 32 slides on the slide rail 34. The step length PI coincides with the spacing between the plates 4 in the conveyor arrangement.

Horizontal frictional forces acting in the feed direction on the slide rail 34, and therewith on the lifting beam 35, are taken-up by the U-shaped members 40, and thereby by the stand 26 by transference from the pins 39, therewith preventing these forces from being transmitted to the piston rods 38 of the lifting cylinders 37.

Subsequent to the walking beams 30 having been stepped forwards one step, the lifting beams 35, and therewith also the walking beams 30, are again lowered until the pins 39 in the U-shaped members 40 engage the plate 41. The plates are again seated in recesses 29 in the fixed supports 28 during this lowering movement, FIG. 6, although in new advanced positions.

The working cycle of the first conveyor arrangement 25 is thereafter completed by returning the walking beams to their rear starting positions, said beams now being free from load. The plates 4 are advanced stepwise by the first conveyor arrangement 25 in this way until they reach the forward end of the conveyor path 1.

Figure 2:
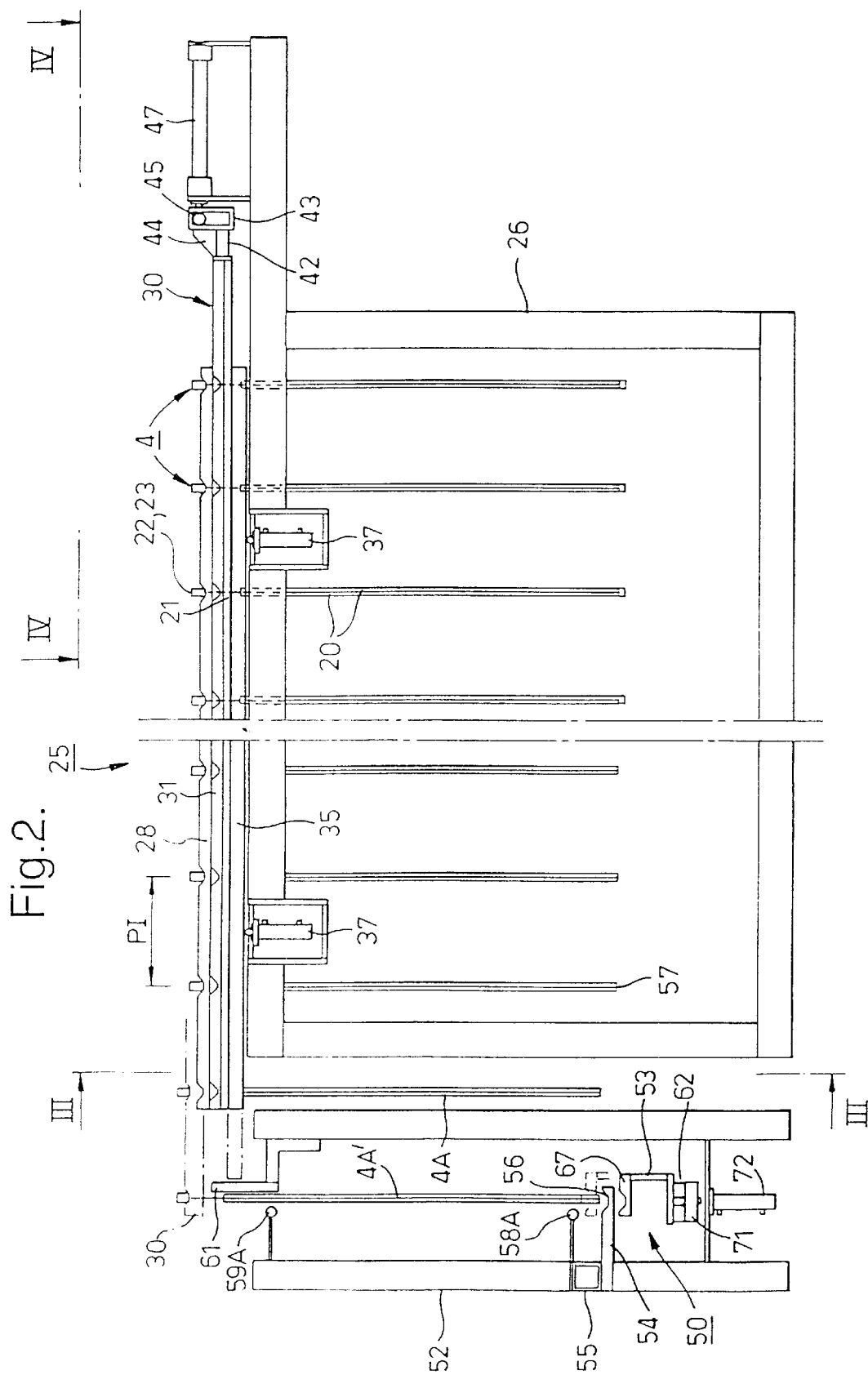
FIG. 2 is an enlarged view taken on the line II—II in FIG. 1 and shows the initial and terminating parts of a first conveyor path for conveying plates in their transverse direction, and shows an initial part of a second conveyor path at right angles to the first conveyor path, wherein the plates are conveyed in their longitudinal direction in said second conveyor path.

The manner in which the plates 4 are transferred from the first conveyor path 25 to the second conveyor path 50 will now be explained with reference to FIG. 2. It is assumed that the receiving station 6 is empty and that the movable supports 67 in the second conveyor arrangement 50 are located in their lower, rear positions or are moved back to adopt these positions prior to terminating transfer of the plates. It is also assumed that a plate 4A to be transferred has been lifted-up by the waking beam 30, being suspended by on the lugs 23 accommodated in recesses 33. The walking beam 30 is advanced forwards from this position through a step length PI, wherein the plate, referenced 4A' in this position in FIG. 2, hangs immediately above the recesses 56 in the fixed supports 54 in the receiving station 6 on a level at which the lower edge 57 of the plates is positioned above the upper level of the movable supports 67. Any tendency of the plate 4A' to swing as the walking beam 30 is braked is taken-up and quickly dampened by the lower, outer side support 58A. During this transfer movement, the plate 4A-4A' passes between the upper, rear side support 61 in the receiving station 6, at the same time as the lugs 23 pass over said side support 61. The walking beam 30 is then lowered, as described above with regard to the working cycle of said beam, such as to cause the bottom edge 57 of the plate 4A' to rest in the recess 56 on the fixed supports 54 in the receiving station. This takes place before the walking beam 30 has reached its bottom position. The lugs 23 are thus released from the recesses 33 in the movable supports 31 of the walking beam 30 during the final phase of the lowering movement of the beam 30. The waking beams 30 are then drawn back by said first hydraulic cylinder 47. It will be understood that a plurality of plates 4 are advanced one step in the conveyor arrangement 25 in accordance with the aforegoing, in parallel with transferring the plate 4A-4A' to the next conveyor arrangement 50 in line. It should also be mentioned that the movable supports 67 in the second conveyor arrangement 50 may be located in their upper positions (shown in broken lines in FIG. 2) during the first phase of the transfer operation, but that they are lowered to their lower positions immediately prior to the walking beams 30 being lowered and the plate 4A' removed from the fixed supports 54 in the receiving station 6.

The side support 59A prevents the thus offloaded plate 4A' from falling forwards in the receiving station 6, while the side supports 61 prevent the plate from falling backwards. The first-mentioned side support 59A acts directly on the plate 4A', whereas the rear side supports 61 act on the lugs 23.

A working cycle of the second conveyor arrangement 50 will now be described. It is assumed that a plate 4A' is present in the receiving station 6 and that the offloading station 10 is empty or at least one possible plate in the offloading station has been transferred to the third conveyor arrangement 51. It is also assumed that the walking beam 62 is located in its rear position, FIG. 7. The working cycle is begun with the second lifting cylinder 72 raising the lifting beam 71 and therewith the walking beam 62 from a lower position determined by the lower female members 76, to an upper position determined by the upper female member 77. Thus, the extent of this lifting movement is defined by the distance between said members 76 and 77. At the same time, the lower male members 80 move out of engagement with the lower female members 76 and, at the end of the lifting movement, the upper male members 81 engage in the hole 79 in the upper female member 77. This lifting movement brings the movable supports 67 into contact with the bottom edge of respective plates 4A', 4. This upward movement then continues so that the plates 4A', 4 are lifted from the fixed supports 54 with the aid of the movable supports 67. The teeth on the rack 64 slide against and in engagement with the teeth on the pinion wheel 68 during the whole of this lifting movement.

Figure 9A:
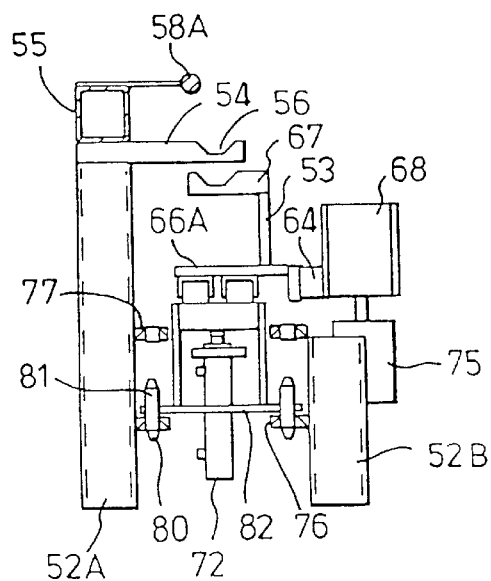
FIGS. 9A and 9B are views taken on the line IX—IX in FIG. 7 showing the second conveyor arrangement in two different positions.
Figure 9B:
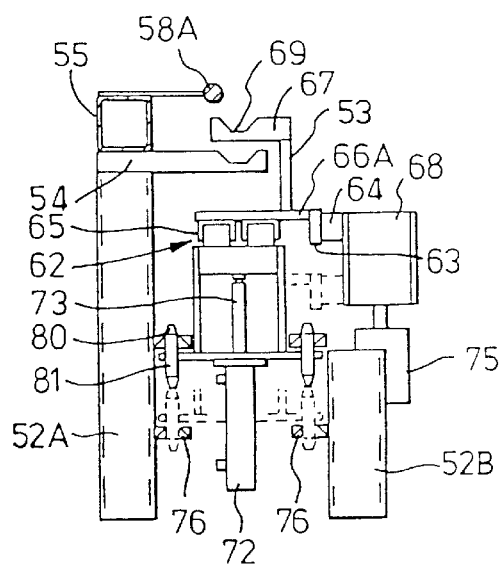

The walking beam 62 is then advanced one step with the aid of the motor 75 through the medium of the pinion wheel 68 and rack 64, wherewith the movable supports 67 pass over the fixed supports 54, FIG. 9B. The step length is equal to the spacing PII between the plates along said second conveyor path 2. Similar to the case in the first conveyor arrangement 25, acceleration and retardation forces are dampened by proportional valves in the hydraulic lines (not shown) supplying the motor 75, which in this case is an hydraulic motor. Corresponding electrical control means are used when the motor is an electric motor. This essentially prevents the plates from sliding on their movable supports 54. The plates are able to lean against the upper side supports 59A, 59B during horizontal movements of the plates, while the lower side supports 58A and 58B prevent the plates 4 leaving the recesses 69. It will be understood that only the mother plates 21 are advanced beyond the terminating stations 9 and 10, whereas the metal coatings 20 stripped from the plates are recovered in a manner not applicable to the present invention.

The transfer of horizontal frictional forces acting on the lifting beam 71 during said horizontal movement to the piston rod 73 of the lifting cylinders 72 is prevented by virtue of the engagement of the upper male members 81, FIG. 9B, with the upper female members 77, which in turn are attached to the stand 52. Thus, the horizontal frictional forces acting on the lifting beam 71 are transferred to the stand 52 via the bracket means 82, the male members 81 and the upper female members 77 during said forward movement, FIG. 9B, and by the bracket means 82, the lower male members 80 and the lower female members 76 during the return movement, as described below.

Subsequent to having moved the plates 4A', 4 one step forwards through the step length PII, the lifting beam 71, and therewith the walking beam 62, is lowered to its lower position determined by the lower female members 76, wherein the plates are deposited in their new positions into the recesses 56 on new fixed supports 54. Any plate or plates that has or have slipped in the recesses 64 despite damping of the acceleration and retardation forces with the aid of said proportional valves will be centered in the station with the aid of the end supports 74 during this lowering movement of the lifting beam. Although this should be evident from FIG. 7 and also from the above description of the equipment, it will also be mentioned here that the fixed supports 54 and the movable supports 67 in all stations 6–10 are placed in different positions as seen in the longitudinal direction of the conveying arrangement 50 when the walking beam 62 has adopted one of its two stationary positions during the working cycle.

The movable supports 67 are empty during the return movement and therewith pass beneath the fixed supports 54, FIG. 9A, which now support plates resting in the recesses 56. During this return movement, the horizontal frictional forces acting on the lifting beam 71 are taken-up via the bracket means 82 and the lower male members 80 and transferred to the lower female members 76 and therewith to the stand 52. Return of the walking beam 62 to its second position signifies completion of the working cycle of the second conveyor arrangement 50. Forward movement of the walking beam 62 during the aforedescribed working cycle results in the deposition of a plate in the outfeed station 10. Prior to subsequent lowering of the walking beam 62 to its lower position, walking beams included in the third conveyor arrangement 51 have been moved beneath the projections 23 on the plate in the offloading station 10, so that the plate, designated 4A" in FIG. 7, is placed on the walking beams in the third conveyor arrangement 51 as lowering of the walking beam 62 in the second conveyor arrangement 2 continues. In other respects, the third conveyor arrangement 51 in the conveyor path 3 operates in a similar manner to that described with reference to the first conveyor arrangement 25 although "in reverse" and moves the plate away from the offloading station 10 during the next phase of the working cycle.

The working cycles of the three conveyor arrangements, of which the working cycles of the conveyor arrangements 25 and 50 have been described in detail above, are controlled by a microprocessor. Programming of the microprocessor is determined by a number of parameters, among other things by the treatment to which the plates are to be subjected in the stations 7, 8 and 9 along said second conveyor path 2.

The microprocessor is also programmed to feed a plate 4A, 4A' into the receiving station 6 in parallel with the outfeed of a plate from the outfeed station 10. The microprocessor is also programmed so that a new plate 4, 4A' will not be fed into the receiving station 6 until the station is empty and another plate, more specifically a mother plate 21, has been advanced to the outfeed station 10. It will be understood that the working cycles of the three conveyor arrangements 25, 50 and 51 are synchronized with one another, although this does not mean that the individual parts of the working cycles are carried out synchronously but are rather phase displaced relative to one another.

What is claimed is:

1. An arrangement for conveying plates (4) in particular mother plates with or without a deposited metal layer, in an electrolytic metal refining plant, wherein the plates are intended to be conveyed in the conveyor arrangement (25, 50) along at least one horizontal conveyor path with the plates oriented generally vertical and equidistant from one another in the conveyor path, characterized in that the conveyor arrangement is of the walking beam kind and includes fixed supports (28, 54) and at least one walking beam (30, 62) having movable supports (31, 67), wherein the walking beam is arranged to move in a cyclic pattern, including a lifting movement in which all the plates supported by the fixed supports are lifted by the movable supports, a forward movement in which all plates are advanced simultaneously one step while resting on their movable supports, a lowering movement in which the plates are placed on fixed supports in a new, second position, and a return movement, wherein the length of one step corresponds to the plate spacing (PI; PII) along the path, and further characterized by lifting beams (35, 71) which function to lift the walking beams, lifting devices (37,73) for lifting and lowering the lifting beams and therewith also the walking beams, and means (39, 40, 76, 77, 80, 81, 82) for preventing longitudinal movement of the lifting beams, wherein the walking beams are intended to slide on the lifting beams during longitudinal movement of said walking beams.

2. An arrangement according to claim 1, characterized in that the fixed and the movable supports are located beneath projections (23) which extend laterally outwards from the plates in the plane of said plates; and in that the plates are intended to be advanced in the transverse direction thereof.

3. An arrangement according to claim 2, characterized in that the plates are intended to rest with their bottom edges on said fixed and said movable supports (54, 67) respectively; and in that the plates are intended to be advanced while resting on the movable supports (67) in the longitudinal direction.

4. An arrangement according to claim 2, characterized in that the arrangement includes two parallel walking beams (30), each having movable supports disposed beneath said projections (23), and a series of fixed supports beneath respective projections on one side of each of said walking beams.

5. An arrangement according to claim 3, characterized by a walking beam (62) having movable supports (67) beneath the plates and a series of fixed supports (54, 56) which are also located beneath the plates; and in that the movable supports are intended to pass over the fixed supports as the walking beam moves forwards and to pass beneath the fixed supports as the walking beam makes a return movement.

6. An arrangement according to claim 4, characterized in that the movable supports on the walking beams function to hold the plates by engaging with said projections (23), preferably by virtue of projection-receiving recesses (29) provided in the supports (28).

7. A plate conveyor line comprising at least two conveyor paths placed perpendicular to one another, comprising a first conveyor arrangement (25) by means of which the plates are moved essentially vertically perpendicular to the plane of said plates, and a second conveyor arrangement (50) by means of which the plates are moved essentially vertically to the plane of the plates, characterized in that the first conveyor arrangement (25), which includes two walking beams having supports which act against the projections on said plates, functions to deposit the plates in said second conveyor arrangement as the walking beams are lowered, with the bottom edges (57) of said plates resting on supports.

8. A conveyor line according to claim 7, which also includes a third conveyor path (3) arranged parallel with the first conveyor path (1), characterized by an offloading station in which plates are transferred from the second to the third conveyor path and in which a plate is intended to be placed on walking beams in a third conveyor arrangement (51) operating along said third conveyor path, when movable supports belonging to at least one walking beam in said second conveyor arrangement are lowered to a lower level.

9. An arrangement for conveying plates (4) in particular mother plates with or without a deposited metal layer, in an electrolytic metal refining plant, wherein the plates are intended to be conveyed in the conveyor arrangement (25, 50) along at least one horizontal conveyor path with the plates oriented generally vertical and equidistant from one another in the conveyor path, characterized in that the conveyor arrangement is of the walking beam kind and includes fixed supports (28, 54) and at least one walking beam (30, 62) having movable supports (31, 67), wherein the walking beam is arranged to move in a cyclic pattern, including a lifting movement in which all the plates supported by the fixed supports are lifted by the movable supports, a forward movement in which all plates are advanced simultaneously one step while resting on their movable supports, a lowering movement in which the plates are placed on fixed supports in a new, second position, and a return movement, wherein the length of one step corresponds to the plate spacing (PI; PII) along the path, and further characterized by upper and lower stop means (39, 40, 41, 76, 77, 82) which define the length and terminal positions of the vertical movement of the walking beams.

10. An arrangement for conveying generally vertically oriented plates, in particular mother plates with or without a deposited metal layer in an electrolytic metal refining plant, along a horizontal conveyor path wherein the conveying arrangement is a walking-beam conveyor and includes fixed supports spaced apart along the horizontal conveyor path at uniform spacing, a walking beam having movable supports spaced apart therealong at uniform spacing equal to the spacing of the fixed supports, a lifting beam on which the walking beam rests in sliding fashion, a lifting means for lifting and lowering the lifting beam and therewith also the walking beam, a means for restraining the lifting beam against longitudinal movement, and a means for guiding the walking beam to move in a cyclic pattern starting from a position in which the movable supports are below the fixed supports and the plates are in respective fixed supports, the cyclic pattern including a lifting phase in which the walking beam moves upwards from the starting position and the movable supports lift all the plates from their respective fixed supports, an advancing phase in which the walking beam moves longitudinally in a first direction by a predetermined distance equal to said uniform spacing and the movable supports advance the plates simultaneously by said predetermined distance, a lowering phase in which the walking beam moves downwards and the movable supports deposit the plates in respective fixed supports, and a returning phase in which the walking beam moves longitudinally back to said starting position.

11. An arrangement according to claim 10, wherein each plate has a horizontal upper edge and two opposite vertical edges and includes projections which extend laterally beyond said vertical edges, substantially parallel to the upper edge, and the projections engage the fixed supports when the walking beam is in the starting position and the vertical edges of the plate are substantially perpendicular to said longitudinal direction.

12. An arrangement according to claim 11, wherein the conveyor arrangement includes two parallel walking beams each having a plurality of movable supports at said uniform spacing and first and second series of fixed supports adjacent the first and second walking beams respectively, the plates being between the first and second walking beams.

13. An arrangement according to claim 12, wherein the movable supports on the walking beams hold the plates by engaging with the projections.

14. An arrangement according to claim 13, wherein the movable supports are formed with recesses for receiving the projections.

15. An arrangement for conveying generally vertically oriented plates, in particular mother plates with or without a deposited metal layer in an electrolytic metal refining plant, along a horizontal conveyor path wherein the conveying arrangement is a walking-beam conveyor and includes fixed supports spaced apart along the horizontal conveyor path at uniform spacing, a walking beam having movable supports spaced apart therealong at uniform spacing equal to the spacing of the fixed supports, and a means for guiding the walking beam to move in a cyclic pattern starting from a position in which the movable supports are below the fixed supports and the plates are in respective fixed supports, the cyclic pattern including a lifting phase in which the walking beam moves upwards from the starting position and the movable supports lift all the plates from their respective fixed supports, an advancing phase in which the walking beam moves longitudinally in a first direction by a predetermined distance equal to said uniform spacing and the movable supports advance the plates simultaneously by said predetermined distance, a lowering phase in which the walking beam moves downwards and the movable supports deposit the plates in respective fixed supports, and a returning phase in which the walking beam moves longitudinally back to said starting position, and wherein each plate has a substantially horizontal bottom edge and two opposite vertical edges and the plates rest with their bottom edges on the fixed supports when the walking beam is in the first position and the bottom edge of the plate is substantially parallel to said longitudinal direction.

16. An arrangement according to claim 15, wherein the walking beam has movable supports projecting therefrom transversely of the plates and the fixed supports extend beneath the plates and project transversely of the plates and wherein during movement of the walking beam the movable supports pass over the fixed supports as the walking beam moves in the advancing phase and pass beneath the fixed supports during the return phase.

17. An arrangement for conveying generally vertically oriented plates, in particular mother plates with or without a deposited metal layer in an electrolytic metal refining plant, along a horizontal conveyor path wherein the conveying arrangement is a walking-beam conveyor and includes fixed supports spaced apart along the horizontal conveyor path at uniform spacing, a walking beam having movable supports spaced apart therealong at uniform spacing equal to the spacing of the fixed supports, and a means for guiding the walking beam to move in a cyclic pattern starting from a position in which the movable supports are below the fixed supports and the plates are in respective fixed supports, the cyclic pattern including a lifting phase in which the walking beam moves upwards from the starting position and the movable supports lift all the plates from their respective fixed supports, an advancing phase in which the walking beam moves longitudinally in a first direction by a predetermined distance equal to said uniform spacing and the movable supports advance the plates simultaneously by said predetermined distance, a lowering phase in which the walking beam moves downwards and the movable supports deposit the plates in respective fixed supports, and a returning phase in which the walking beam moves longitudinally back to said starting position, and wherein the arrangement further comprises upper and lower stop elements which limit vertical movement of the walking beam.

\* \* \* \* \*